United States Patent
Yi

(12) United States Patent (10) Patent No.: US 6,339,936 B1
Yi (45) Date of Patent: Jan. 22, 2002

(54) PHASE-CHANGEABLE AND NON-HEAT REFRIGERATION PROCESS AND APPARATUS THEREOF

(76) Inventor: Yuanming Yi, 51 Jiangwan Xin Chun, Li Ling City, Human Province (CN), 412200

(*) Notice: Subject to any disclaimer, the term of this patent is extended or adjusted under 35 U.S.C. 154(b) by 0 days.

(21) Appl. No.: 09/530,348
(22) PCT Filed: Oct. 23, 1998
(86) PCT No.: PCT/CN98/00253
  § 371 Date: Apr. 26, 2000
  § 102(e) Date: Apr. 26, 2000
(87) PCT Pub. No.: WO99/22187
  PCT Pub. Date: May 6, 1999

(30) Foreign Application Priority Data

Oct. 27, 1997 (CN) .......................................... 97119920

(51) Int. Cl.[7] ................................................ F25B 7/00
(52) U.S. Cl. ...................................................... 62/335
(58) Field of Search ........................... 62/332, 333, 335

(56) References Cited

U.S. PATENT DOCUMENTS

| | | | | |
|---|---|---|---|---|
| 3,322,188 A | * | 5/1967 | Ostrander | .................... 62/333 |
| 5,335,508 A | * | 8/1994 | Tippmann | .................... 62/129 |
| 5,467,812 A | * | 11/1995 | Dean et al. | .................... 62/332 |
| 5,784,893 A | * | 7/1998 | Furuhama et al. | ............ 62/333 |

* cited by examiner

*Primary Examiner*—William E. Tapolcai
(74) *Attorney, Agent, or Firm*—Jenkens & Gilchrist, P.C.

(57) ABSTRACT

A pure-phase-trans formation and heatless (PPT&H) refrigerating process and method of installation. The system comprises a phase-transformation multistage refrigeration cycle of at least two stages. The first stage compresses vapor, the other stages all utilize the cool of lower temperature provided by the refrigeration cycle of the preceding stage to liquefy the vapor of the current stage to implement the refrigeration cycle by means of cool. A compressor and a condenser of the next stage are immersed in the liquid-state refrigerant of the next stage to have the generated heat all absorbed by the vaporizing latent heat of the next stage, so that the temperature of condensation becomes approximately the temperature of evaporation to achieve normal refrigeration and supplying cool. The evaporation temperature of the refrigerant in each refrigeration cycle rises stage by stage according the connecting sequence of the system. The intermediate-stages multiply the refrigerated cool stage by stage and the final stage supplies cool to the outside space. This system has no heat exhaustion to the outside environment and has very high refrigerating efficiency.

5 Claims, 2 Drawing Sheets

PHASE-CHANGEABLE AND NON-HEAT REFRIGERATION PROCESS AND APPARATUS THEREOF

TECHNICAL FIELD

The present invention relates generally to a refrigeration technique, and in particular but not by way of limitation, to a pure-phase-transformation and heatless ("PPT&H") refrigerating process and method installation implemented by phase transformation without heat exhaustion to the outside environment.

SUMMARY OF THE INVENTION

Prior art refrigerating techniques, especially those of the vapor-compression type widely used in industrial and civilian fields, comprise simultaneous heat exhaustion to the outside environment during refrigeration, with a significantly greater amount of heat produced versus the amount of cooling generated. With regards to environmental effects, prior art refrigerating techniques represent a vicious circle of circumstances: increases in refrigeration result in more heat production, which in turn leads to an increased failure in refrigeration, which thus produces more heat. The prior art shows that lowest refrigerating efficiency occurs in the relatively large temperature difference between the vaporization temperature of the refrigerator and the environmental condensing temperature, which may lead to failure in refrigeration.

The object of the present invention is to provide a novel PPT&H refrigerating process and method of installation with a greater amount of cooling produced versus heat generated without heat exhaustion to the outside environment, and with high refrigerating efficiency.

In a PPT&H refrigerating process, the first-stage refrigeration comprises evaporation for vaporization of the liquid-state refrigerant, release of latent heat in vaporization, and generation of a refrigerating effect. The generated vapor is compressed into higher temperature gases, cooled through heat exhaustion and temperature reduction, and condensed into a liquid-state medium. The liquid-state medium is subjected to further cooling after flow restriction, followed by reabsorption of heat, thereby refrigerating through evaporation. The vapor is removed and the vapor pressure is reduced to bring the evaporation temperature to a predetermined value.

The system comprises a phase-transformation multistage refrigeration cycle of two or more stages, including a first- and a final-stage refrigeration cycle. In the first stage, a refrigerating compressor and a condenser are immersed in a liquid-state refrigerant of the next stage to have the generated heat absorbed by the vaporizing latent heat of the liquid-state refrigerant. This causes the temperature difference between the refrigerating evaporation temperature in the first refrigeration cycle and that of the condensing environment to be reduced to a value suitable to allow the first-stage refrigeration cycle to achieve normal refrigeration.

After the first stage, further steps are performed by phase transformation to refrigerate by cooling. Subsequent to refrigeration by refrigerant phase transformation. The next stages all utilize the lower temperature effect provided by the refrigeration cycle of the first stage to lower the temperature and condense the vapor generated. The vapor condensation allows recovery of the medium into a liquid state.

Finally, the refrigeration cycle is subjected to cooling methods. In every stage of this cycle, the vapor is first condensed into a liquid-state overcooled medium and allowed to flow downwardly in layers. Convection-based heat exchanging occurs next, with the evaporating vapor incessantly entering from below and moving upwardly in layers. Eventually, the vapor completely transforms into a liquid-state medium of the approximate saturation point, thereby reducing to a minimum the cooling dissipated during evaporation of the condensate. During the same stage of the cycle, the cooling provided by the refrigerant phase transformation is much greater than that dissipated in vapor liquification.

The refrigeration cycle in the final stage is done with the refrigerating effect, and the resultant cooling that the cycle produces is supplied outwardly.

The evaporation temperature of the refrigerant in each refrigeration cycle rises incrementally by stage according to the connecting sequences of the system. The result is that the refrigerant in the first stage has a low evaporation temperature, whereas the final-stage refrigerant has a high evaporation temperature.

There is also provided a PPT&H refrigerating installation system comprising a heat-insulated refrigerating compressor, a condenser connected with the compressor, a throttling device connected with the compressor, a second throttling device connected on the opposite side of the condenser through a high-pressure line, and an evaporator connected with the throttling devices through a liquid transfer line. The other end of the evaporator is connected with the compressor through a gas reflux line, thus forming the refrigeration cycle of the first stage with refrigerant filled therein.

The installation further comprises a first heat-insulated pressure vessel, a working-medium pump, a liquid transmission line, a heat-insulated gas-reflux line, a final stage evaporator, and a first-stage heat-insulated pressure vessel. The first heat-insulated pressure vessel has its bottom portion filled with liquid-state refrigerant and divided into an upper level and a lower level. The lower level is an enclosed space, with the first-stage refrigerating compressor and the condenser incorporated therein. The upper level and lower level are in communication via a liquid-level regulator, a liquid-supplementing line and an air line. At least two rows of plates, arranged in an interleaved manner for condensing the overcooled medium, are provided in the middle part of the first heat-insulated pressure vessel. The middle part forms a condensing space for repeated exploitation of the cooling effect.

A first-stage evaporator is mounted on the top part of the first heat-insulated pressure vessel, in which a final-stage evaporator is included. The working medium pump coupled to the first heat-insulated pressure vessel has a portion connected with the final-stage evaporator via liquid medium transfer lines. The final-stage evaporator is connected with the first heat-insulated pressure vessel via a heat-insulated gas-reflux line. A final-stage phase-transformation refrigerating cycle is operated by actuating the working-medium pump, introducing the refrigerant into the pump, pressurizing the refrigerant, and entering the final-stage evaporator via the liquid transfer lines. Finally, the vapor is generated after the evaporation of the refrigerant entering into the condensing space inside the first vessel via the gas reflux line, thus supplying cooling to the outside space.

The present invention has, through refrigeration, advantageously used the latent heat of the vaporization of the liquid-state medium. Instead of mechanically compressing the vapor medium in the stages of the phase-transformation refrigeration cycle following the first stage refrigeration, the present invention condenses the vapor medium by reducing its temperature through saturation. Moreover, since the cooling supplied during temperature-reducing condensation of the saturated vapor can be repeatedly exploited, the inherent cooling consumption is minimal. Further, the use of the prior vapor-compressing refrigerating techniques in producing inherent cooling results in relatively high refrigerating efficiency with minimal heat generation. Additionally, because of the small amount of heat to be consumed by the latent heat of vaporization of the liquid-state refrigerant, the refrigerating process and method of installation according to the present invention exhausts no heat to the outside environment, thus resulting in a high refrigeration efficiency.

BRIEF DESCRIPTION OF THE DRAWINGS

The present invention will be described in detail below in conjunction with the appended drawings and claims, wherein:

PREFERRED EMBODIMENTS OF THE INVENTION

Figure 1:
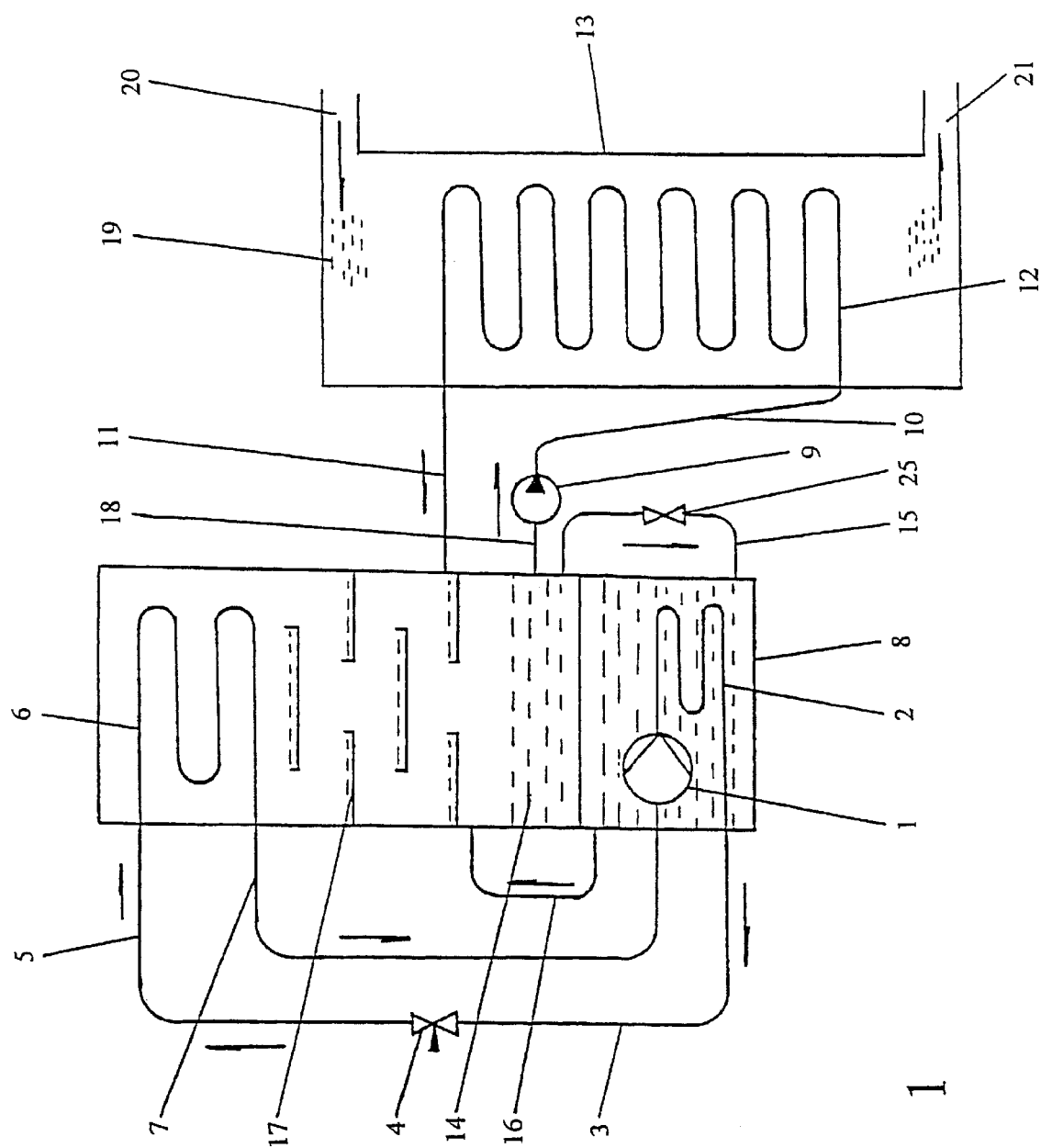
FIG. 1 is a schematic diagram of the PPT&H refrigerating process and installation according to the present invention.

Referring to FIG. 1, the system of the present invention comprises a phase-transformation multistage refrigeration cycle of at least two stages including a first-stage and a final-stage refrigeration cycle. The first-stage refrigeration cycle utilizes the prior art by using evaporation to vaporize the liquid-state refrigerant, releasing the latent heat of vaporization, producing a refrigerating effect, compressing the vapor thereby increasing its pressure and temperature, reducing the temperature to cool by heat exhaustion, further cooling the liquid-state medium following flow restriction, followed by refrigeration through heat absorption for evaporation, and having had the vapor sucked out to reduce the vapor pressure, the temperature of evaporation is regulated to the setting value.

The PPT&H refrigerating process according to the present invention has unique features. The refrigerating compressor and the condenser in the first-stage vapor-compressing refrigeration cycle are immersed in the next-stage liquid-state refrigerant. This immersion results in all of the heat accordingly generated to be absorbed by the latent heat of vaporization in the vaporizing refrigerant in the next-stage liquid-state. This reduces the temperature difference between the refrigerating temperature of evaporation in the first refrigeration cycle and that of the condensing environment to a predetermined value to achieve normal refrigeration of the first-stage refrigeration cycle.

Other stages of the cooling phase-transformation refrigeration cycle utilize the cooling provided by the previous-stage refrigeration cycle. This results in the reduction of the temperature of the vapor generated after the phase-transformation of the refrigerant in the present-stage so as to be condensed. In each stage of the cooling phase-transformation refrigeration cycle, the vapor is first condensed into an overcooled liquid-state medium, which flows down in layers to exchange heat by convection with the vapor incessantly entering from below and blowing up in layers. The vapor eventually turns into a liquid-state medium of a temperature approximating its saturation point, so as to reduce the cooling consumed by the condensed and liquefied vapor to a trace. In the same cooling refrigeration cycle, the refrigerating effect of the vaporized refrigerant is much greater than the cooling consumed by the liquefied vapor.

The refrigerating effect produced by the final-stage cooling phase-transformation refrigeration cycle is supplied to the outside cooling environment.

In each refrigeration cycle, the evaporating temperature of the refrigerant increases incrementally in accordance with the connecting sequence of the system. Accordingly, the first stage refrigerant temperature is low and that of the final stage is high.

During the cooling pure-phase-transformation refrigerating cycle, because the inherent cooling consumed appears only in trace, such as in the case of the large refrigerating effect in the next-stage, the power required by the first-stage refrigeration is very little, and results in a very high refrigerating efficiency. With constant mechanical power consumed in the first-stage refrigeration, the large refrigerating effect obtained in the first-stage may further be used as initial cooling to perform a third-stage cooling phase-transformation refrigerating cycle and further to perform a fourth-, a fifth-, and greater stage cooling phase-transformation refrigerating cycles. The resulting refrigerating efficiency may therefore be very high.

According to the present invention, the more-than-two multistage refrigeration cycle comprises the inclusion of an intermediate-stage refrigeration cycle between the first and the final stage. The refrigerating effect obtained in the first or previous stage is used for condensing the refrigerant vapor in the next stage to condense the vapor into an overcooled liquid-state medium and allow it to flow down in layers. The medium once again exchanges heat with the vapor incessantly entering from below, and eventually turns into a liquid-state refrigerant having a temperature approximating the saturation point.

The intermediate-stage refrigeration cycle can comprise of one or more substages. The multistage cooling phaseDallas2 transformation refrigerating system may be use various refrigerants having different boiling points. For example, refrigerants of different boiling points may be selected according to the connecting order of the system. Refrigerants having lower boiling points may be selected for the first stage, and those having higher boiling points may be selected for the final stage in the system connecting order. Alternatively, the system may use the same refrigerant at different boiling points corresponding to different pressures depending on the pressure requirement. For example, the same kind of refrigerant may be used while setting the evaporating temperature in the first stage low and that in the final stage high.

The PPT&H refrigerating installation according to the present invention is implemented by using the above-mentioned PPT&H refrigerating process. As shown in FIG. 1, a heatless refrigerating installation comprises a refrigerating compressor 1 of the prior art, a condenser 2 coupled to the compressor 12, a throttling device 4 coupled to the other end of the condenser 2 via a high-pressure line 3, and an evaporator 6 connected with the throttling device 4 via a liquid transfer line 5, with the other end of the evaporator 6 coupled to the compressor 1 via a gas-reflux line 7, forming a first-stage refrigeration cycle filled with refrigerant therein. The PPT&H refrigerating installation further includes a first heat-insulated pressure vessel 8, a working-medium pump 9, a liquid-medium transfer line 10, a heat-insulated gas-reflux line 11, a final-stage evaporator 12, and a final-stage heat-insulated pressure vessel 13.

The pressure vessel 8 is filled with liquid-state refrigerant 14 at the bottom, and is divided into two levels: an upper level and a lower level. The lower level is an enclosed space, with the compressor 1 and the condenser 2 being immersed in the refrigerant 14. The two levels are in communication via a liquid-level regulator 25, a liquid supplementing line 15 and an air line 16. The first vessel 8 is provided with more-than two-rows of overcooled liquid-state refrigerant condensing plates 17 arranged in an interleaved manner in the middle part, and forms a condensing space for repeated exploitation of the cooling effect. The evaporator 6, i.e. the first-stage evaporator 6, is mounted on the top of the first vessel 8.

A final-stage evaporator 12 is mounted in the final-stage heat-insulated pressure vessel 13.

The working-medium pump 9 is coupled to the first heat-insulated pressure vessel 8 via a liquid-suction line 18. The other end of the pump 9 is coupled via the liquid-medium transfer line 10 to the final-stage evaporator 12, which is connected with the first heat-insulated pressure vessel 8 through the heat-insulated gas-reflux line 11. In operation, the pump 9 is actuated to cause the liquid-state refrigerant 14 to enter into the pump 9. Having been subjected to pressurization, the refrigerant 14 next enters into the final-stage evaporator 12. The vapor generated by the vaporization comes into the condensing space in the first heat-insulated pressure vessel via the heat-insulated gas-reflux line 11, forming the final-stage cooling refrigeration cycle, thereby supplying cooling to the outside environment.

The operating process of the PPT&H refrigerating installation according to the present invention follows.

1. The lower level of the first heat-insulated pressure vessel 8 is filled with liquid-state refrigerating medium 14, the first-stage refrigerating cycle is filled with refrigerating medium, and the final-stage refrigerating cycle is filled with refrigerant 19.

2. The refrigerating compressor 1 is actuated. Because the compressor 1 and the condenser 2 are immersed in the refrigerating medium 14, the heat generated by the first-state refrigerating cycle in the initial actuating period raises the temperature of the medium 14 to the evaporating temperature. Meanwhile, because the evaporator 6 is able to rapidly achieve a normal cooling condition, the liquid-state refrigerant 14 in the lower level of the first heat-insulated pressure vessel 8 begins to vaporize from its self-heat-absorption. Further, the vapor entering into the upper level of the first heat-insulated pressure vessel 8 is condensed by the evaporator 6 into an overcooled liquid-state refrigerant, which flows down in layers along the overcooled liquid-state refrigerant condensing plates 17, forming a condensing-temperature gradient.

3. In the first heat-insulated pressure vessel 8, because the liquid-state refrigerant 14 in the lower level has been heated by the heat dissipated in the first-stage refrigeration cycle for a certain period, the pressure in the upper level is lower than that of the lower level. At this time, the temperature of the liquid-state refrigerant 14 in the lower level stops rising and begins evaporating into vapor. When the liquid level is lowered due to evaporation of the liquid state refrigerant 14, the liquid-level regulator 25 automatically supplements the lower level with the liquid-state refrigerant 14 of the upper level in the first heat-insulated pressure vessel 8 via the liquid-supplementing line 15. This maintains the liquid level of the refrigerant 14. In the lower space of the first heat-insulated pressure vessel, the vapor generated from consumption of the heat produced by the firststage refrigeration entering into the condensing space of the first vessel 8 becomes completely liquefied.

4. The working-medium pump 9 is actuated, allowing the liquid-state refrigerant 14 entering into the pump 9 via the liquid suction line 18 to be subjected to pressurization before entering into the final-stage evaporator 12 via liquid transfer line 10. The flow of the cool carrier 19 from the inlet 20 through the final-stage heat-insulated pressure vessel 13 and out of the outlet 21 incessantly provides normal temperature heat, resulting in the refrigeration through evaporation and vaporization of the refrigerant. The vaporized vapor enters into the condensing space in the first vessel 8 via the gas-reflux line 11.

5. The cooling carrier 19 continuously entering from the cool carrier inlet 20 exchanges heat with the final-stage evaporator 12 in the last-end heat-insulated pressure vessel 13. This causes the cooling carrier 19 to reach the cooling temperature at the outlet 21, thus supplying the user with complete cooling.

Figure 2:
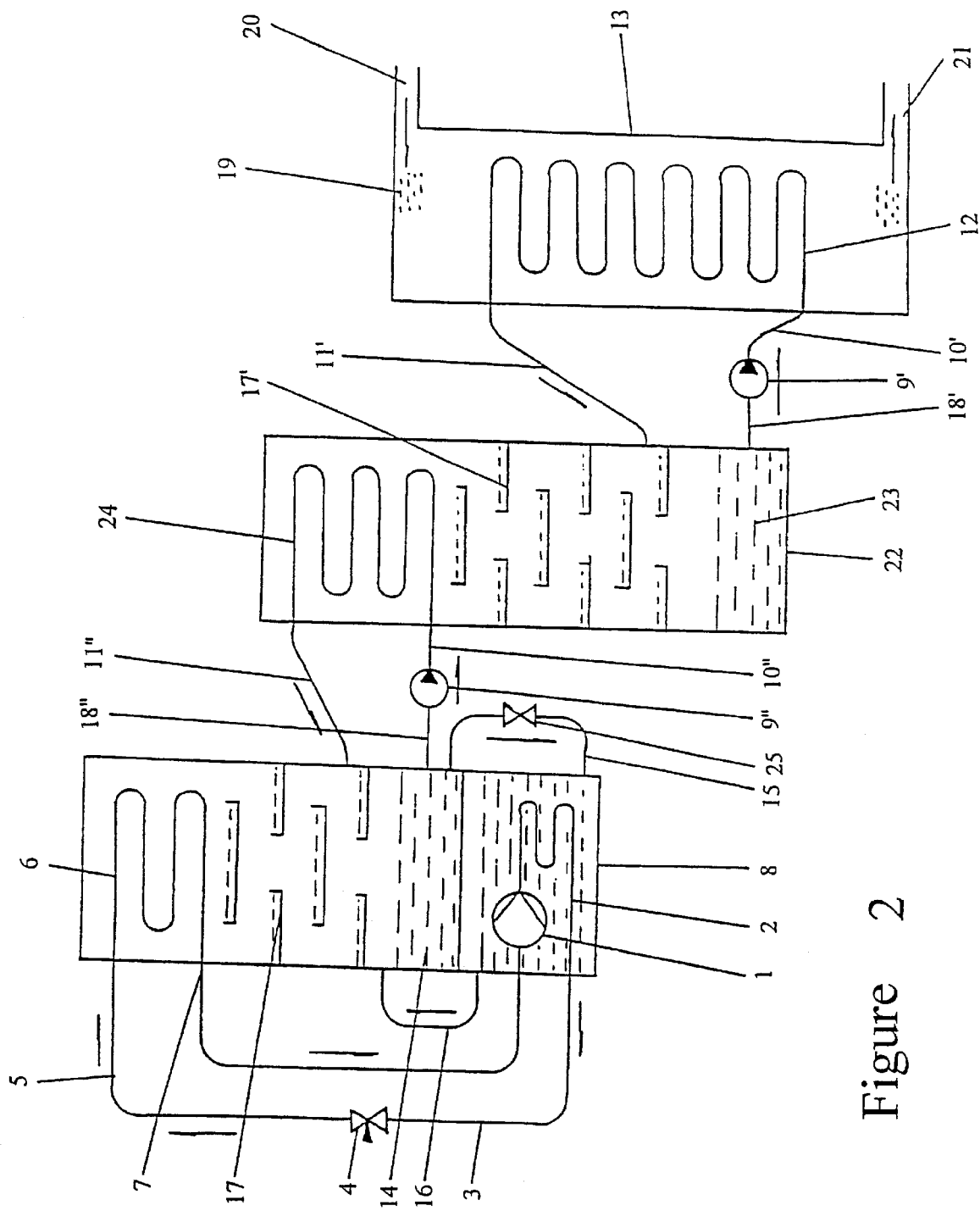
FIG. 2 is a schematic diagram of the above PPT&H refrigerating process and installation including an intermediate-stage refrigeration cycle.

Referring to FIG. 2, the PPT&H refrigerating installation according to the present invention is provided with an intermediate-stage refrigeration cycle between the first and the final-stage refrigeration cycles. Namely, a second heat-insulated pressure vessel is arranged between the first vessel 8 and the final vessel 13 and filled with liquid-state refrigerant 23. It is contemplated that more than two heat-insulated pressure vessels may be used. As shown, in the middle part of the second vessel 22, at least two overcooled liquid-state refrigerant condensing plates 17 are deposed in an alternating configuration, forming a condensing space for repeated exploitation of the cooling generated. An intermediate evaporator 24 communicates with the condensing space in the first vessel or in the previous vessel via a liquid transfer line 10". A heat-insulated gas-reflux line 11" and a working-medium pump 9", is mounted on the top part of the vessel 22, to form a cooling pure-phase-transformation refrigerating cycle. The condensing space in at least two vessels (shown as the vessel 22) communicating with the next-stage evaporator (shown as the final-stage evaporator 12) via the pump 9', the liquid transfer line 10' and the gas reflux line 11' forms a cooling PPT&H refrigeration cycle to thereby perform multistage refrigeration.

As shown in FIG. 2, the PPT&H refrigerating installation includes an intermediate first-stage refrigeration cycle has the same operating steps as those of the above steps 1, 2, and 3. The 4th and subsequent steps follow.

4. The working-medium pump 9' is actuated, allowing the refrigerant 3 to enter into the pump 9' via liquid suction line 18'. After being pressurized, the refrigerant 3 enters the final-stage evaporator 12. The flow of the cooling carrier 19 from the inlet 20 through the final-stage heat-insulated pressure vessel 13 and out of the outlet 21 incessantly provides normal temperature heat, resulting in the refrigeration through evaporation and vaporization of the refrigerant. The vaporized vapor enters into the condensing space in the second vessel 22 of the intermediate-stage refrigeration cycle via the gas-reflux line 11'.

5. The working medium pump 9" is actuated, allowing the liquid-state refrigerant 14 to enter into the pump 9" via the liquid suction line 18". After being pressurized, the liquid-state refrigerant 14 enters the intermediate-stage evaporator 24 via the liquid transfer line 10". As the boiling point of the refrigerant 14 is lower than that of the refrigerant 23 in the intermediate-stage refrigeration cycle, the refrigeration effect provided by the intermediate-stage evaporator 24 condenses the gas-state refrigerant 23, which is condensed into overcooled liquid-state medium flowing down in layers along the overcooled liquid-state medium condensing plates 17', forming a condensing temperature gradient.

6. The continuously operating working-medium pump 9' inputs the liquid-state refrigerant 23, the evaporating temperature of which has reached the setting value, incessantly into the pressure vessel at the end side, making refrigeration through heat absorption from the cooling carrier 19 and vaporization.

7. The cooling carrier 19 continuously entering from the carrier inlet 20 exchanges heat with the final-stage evaporator 12 in the last-end heat-insulated pressure vessel 13, causing the cooling carrier 19 to reach the cooling temperature at the outlet 21, thus supplying the users with complete cooling.

According to the present invention, the temperature of the cooling supplied to the outside may be set arbitrarily between ambient temperature and deep-cooling low temperature.

The PPT&H refrigerating process and installation according to the present invention being high in its refrigerating efficiency saves large amounts of electrical energy and reduces production costs in refrigeration. The applications of the present invention in its principle, and commercial and industrial fields are all included in the appended claims of the present invention. Any improved technique made on this basis is deemed to be derived from the claims of the present invention.

I claim:

1. A PPT&H refrigerating process, the first-stage refrigeration of which comprises evaporation for vaporization of the liquid-state refrigerant, release of latent heat in vaporization, and generation of refrigerating effect, with the generated vapor compressed into gases of higher temperature, cooled down through heat exhaustion and temperature reduction and condensed into liquid-state medium, which is subjected to further cooling down after flow restriction, followed by reabsorption of heat to refrigerate through evaporation and then suction out of vapor and reduction of the vapor pressure to bring the evaporation temperature to the setting value, comprising:

a system, comprising a phase-transformation multistage refrigeration cycle of more-than-two stages composed of a first and a final-stage refrigeration cycle;

a refrigerating compressor for compressing vapor of the first stage to perform a refrigeration cycle and a condenser are immersed in the liquid-state refrigerant of the next stage to have the generated heat all absorbed by the vaporizing latent heat of the liquid-state refrigerant of the next stage;

wherein the temperature difference between the temperature for refrigeration evaporation in the first refrigeration cycle and that of condensing environment is reduced to a value suitable for the first-stage refrigeration cycle to achieve normal refrigeration;

a plurality of phase transformation cycles to refrigerate by cooling means; wherein said plurality of phase transformation cycles utilize the lower temperature cooling provided by the refrigeration cycle of the preceding stage to lower the temperature of and condense the vapor generated after refrigeration by phase transformation of the refrigerant of the current stage so as to recover the medium into liquid state, implementing the refrigeration cycle by cooling means;

wherein each of said plurality of phase-transformation cycles, the vapor is first condensed into a liquid-state overcooled medium, which is flowing downwardly in layers, with heat being exchanged in a convection manner with the vapor incessantly entering from below and blowing up in layers, the vapor eventually turning into complete liquid-state medium of the approximate saturation point, reducing the cooling dissipated during evaporation of the condensate to a minimum;

wherein during the same stage of the cycle, the cooling provided by phase transformation of the refrigerant is much more larger in amount than that dissipated in vapor liquefaction;

wherein the refrigeration cycle in the final stage is done with the refrigerating effect, and the cool the cycle produces is supplied externally; and wherein the evaporation temperature of the refrigerant in each refrigeration cycle rises stage by stage according to the connecting sequences of the system, with that of the refrigerant in the first stage being low, and that in the final stage being high.

2. A PPT&H refrigerating process as claimed in claim 1, wherein said more-than-two multistage refrigeration cycle comprises the inclusion of an intermediate-stage refrigeration cycle between the first stage and the final stage, wherein the refrigerating effect obtained in the preceding stage of said more-than-two multistage cycle is used for the cooling to condense the refrigerant vapor in the next stage into an overcooled liquid-state medium and allow it to flow down in layers and exchange heat with the vapor incessantly entering from below, and eventually turning into a liquid-state refrigerant having a temperature approximating the saturation point.

3. A PPT&H refrigerating process as in claim 2, wherein said intermediate-stage refrigeration cycle comprises multi-substages.

4. A PPT&H refrigerating installation, comprising:

a heat-insulated refrigerating compressor;

a condenser connected with the compressor;

a throttling device connected with the compressor;

a throttling device connected on the other side of the condenser through a high-pressure line;

an evaporator connected with the throttling device through a liquid transfer line, the other end of the evaporator being connected with the compressor through a gas reflux line, thus forming the refrigeration cycle of the first stage with refrigerant filled therein;

wherein the installation further comprises:
      a first heat-insulated pressure vessel;
      a working-medium pump;
      a liquid transmission line;
      a heat-insulated gas-reflux line;
      a final stage evaporator; and
      a first-stage heat-insulated pressure vessel;

wherein the first heat-insulated pressure vessel has a bottom filled with a liquid-state refrigerant and divided into an upper level and a lower level, the lower level being an enclosed space with the heat-insulated refrigerating compressor and the condenser incorporated therein;

wherein the upper level and the lower level communicate via a liquid-level regulator, a liquid-supplementing line and an air line;

more than two rows of plates arranged in an interleaved manner for condensing an overcooled medium in a middle part of the first heat-insulated pressure vessel, the middle part forming a condensing space for repeated exploitation of the cooling;

a first-stage evaporator mounted on a top part of the first heat-insulated pressure vessel, in which a final-stage evaporator is included;

wherein the working medium pump is coupled to the first heat-insulated pressure vessel at one end and has the other end connected with the final-stage evaporator via liquid medium transfer lines;

wherein the final-stage evaporator is connected with the first heat-insulated pressure vessel via the heat-insulated gas-reflux line;

wherein a final-stage phase-transformation refrigerating cycle is operated by actuating the working-medium pump, introducing the refrigerant into the pump, pressurizing the refrigerant, introducing the refrigerant into the final-stage evaporator via the liquid transfer lines, introducing the evaporated vapor of the refrigerant into the condensing space inside the first vessel via the gas reflux line, thereby supplying cooling to the outside space.

5. A PPT&H refrigerating installation as in claim 4, further comprising:

an intermediate-stage refrigeration cycle provided between the first and the final-stage refrigerating cycles, said intermediate-stage refrigeration cycle comprising at least one heat-insulated vessel arranged between the first vessel and the final vessel and filled with liquid-state refrigerant;

wherein in a middle part of the at least one heat-insulated vessel more-than-two overcooled liquid-state refrigerant condensing plates are disposed interleaving with each other to form a condensing space for repeated exploitation of cooling;

an intermediate evaporator mounted on the top of the vessel and communicating with the condensing space in the preceding vessel via a liquid transfer line, a heat-insulated gas-reflux line and a working-medium pump, the intermediate evaporator forming a cooling pure-phase-transformation refrigerating cycle;

wherein the condensing space in the at least one heat-insulated vessel communicates with the next-stage evaporator via the pump, the liquid transfer line and the gas-reflux line and forms a cooling PPT&H refrigerating cycle.

\* \* \* \* \*